United States Patent [19]

Sheng

[11] 4,311,590

[45] Jan. 19, 1982

[54] PHASE SEPARATION APPARATUS

[76] Inventor: Henry P. Sheng, 3316 Woodbend Dr., Claremont, Calif. 91711

[21] Appl. No.: 190,759

[22] Filed: Sep. 25, 1980

[51] Int. Cl.³ ............................................. B01D 33/06
[52] U.S. Cl. ................................ 210/360.2; 210/380.2; 210/398; 210/520
[58] Field of Search ............ 210/781, 787, 801, 360.2, 210/380.2, 519, 520, 512.1, 398; 422/258, 259

[56] References Cited

U.S. PATENT DOCUMENTS

| | | | |
|---|---|---|---|
| 3,353,752 | 11/1967 | Ranhagen et al. | 210/512.1 |
| 3,385,447 | 5/1968 | Bergstrom | 210/360.2 |
| 3,400,819 | 9/1968 | Burdyn | 210/360.2 |
| 3,448,858 | 6/1969 | Delcellier et al. | 210/360.2 |

FOREIGN PATENT DOCUMENTS 591198  2/1978  U.S.S.R. ............................... 422/259

Primary Examiner—Benoit Castel
Attorney, Agent, or Firm—Larson and Taylor

[57] ABSTRACT

A phase separation apparatus is provided for effecting phase separation of two immiscible liquids. The apparatus comprises an inner rotatable tube the bottom end of which is charged axially with the two liquids, and an outer tube which forms an outer chamber surrounding the inner tube. The inner tube includes a plurality of slots or openings along the length thereof and when the inner tube is rotated the heavier phase liquid will be separated from the lighter phase and will exit through the slots in the inner tube into the outer chamber for collection. The lighter phase is collected at the top of the inner tube.

5 Claims, 2 Drawing Figures

LIGHTER PHASE OUT / TO LIGHTER PHASE COLLECTION

IMMISCIBLE LIQUIDS IN

TO POWER DRIVE

TO HEAVIER PHASE COLLECTION

PHASE SEPARATION APPARATUS

FIELD OF THE INVENTION

The present invention relates to phase separation apparatus for providing phase separation of two immiscible liquids.

BACKGROUND OF THE INVENTION

A number of centrifuge-type devices are known in the art. Some examples of such devices are those disclosed in U.S. Pat. Nos. 4,175,040 (Sammons et al); 3,385,447 (Bergstrom); 3,529,719 (Graybill); 3,052,361 (Whatley et al) and 1,576,108 (Fogler). The Sammons et al patent discloses a centrifugal water-oil separator wherein a water-oil mixture is injected into the top of a spinning pipe having a perforated bowl located at the top thereof; oil passes out through the perforations and further apertures to a collection trough while the waste moves downwardly through the spinning pipe. The Bergstrom patent discloses a centrifugal separator wherein a slotted pipe is disposed within a second pipe and lighter material flows through the slots to the inside of the slotted pipe. The Fogler patent discloses a separator for separating two fluids wherein a mixture of the fluids is supplied at the lower end of a tube and thereafter whirled around. The heavier materials are said to be caused to approach the center of the whirling mass while the lighter materials are said to be concentrated in the outer portions of the mass. The Whatley et al patent discloses a liquid cyclone contactor for separating two immiscible liquids including a series of hydrocyclones. The mixture of the two liquids enter a chamber and establishes two flow streams, with the heavier liquid moving upwardly and downwardly and the lighter liquid moving inwardly and outwardly. The Graybill patent discloses a complex apparatus for cleaning oil of contaminants wherein the oil is charged upwardly in the apparatus with a swirling motion and the water and solid contaminants settle downwardly.

SUMMARY OF THE INVENTION

In accordance with the invention, a phase separation apparatus is provided for enabling phase separation of two immiscible liquids in a straightforward manner while approximating ideal efficiency at selected feed rates. The apparatus of the invention is both simple and robust in construction and is easy to manufacture and maintain.

According to a preferred embodiment thereof, the invention comprises a phase separation apparatus including a rotatable inner tube which receives an axial charge of the two liquids to be phase separated and includes a plurality of openings along the length thereof, an outer tube which surrounds the inner tube and to form an outer chamber therewith, means for rotating the inner tube when the liquids are axially charged into the bottom of that tube so that the heavier phase is separated from the lighter phase and exits through the openings in the inner tube into the outer chamber, means for collecting the heavier phase from the outer chamber, and means for collecting the lighter phase from the top of the inner tube.

The openings or slots in the inner tube are preferably spaced closer together at the top of the tube where the pressure is less to make it easier for the heavier phase to exit through the tube. The inner tube is supported in upper and lower bearings and the outer tube is mounted in a pair of flange assemblies including a gasket captured between a pair of flanges and a sealing element which is biassed into engagement with the inner tube. The rotating means advantageously comprises a pulley member affixed to the inner shaft and driven by a suitable power source.

Other features and advantages of the invention will be set forth in, or apparent from, the detailed description of the preferred embodiments which follows.

DESCRIPTION OF A PREFERRED EMBODIMENT

Figure 1:
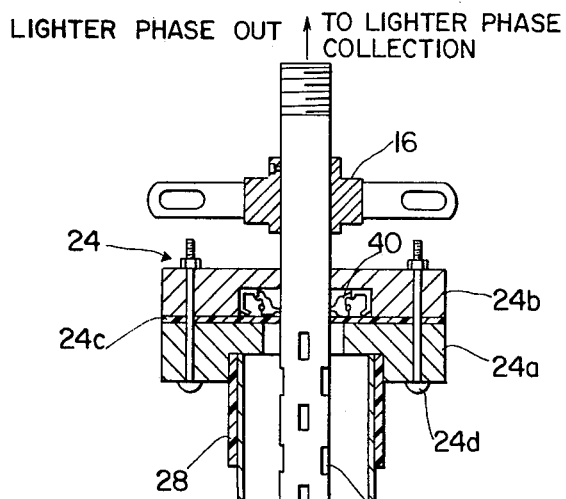
FIG. 1 is a front elevational view, partially in section, of a phase separation constructed in accordance with a preferred embodiment of the invention.

Referring to FIG. 1, a preferred embodiment of the phase separation apparatus of the invention is shown. The apparatus, which is generally denoted 10, basically comprises an inner rotary pipe or tube 12 and an outer fixed pipe or tube 14.

Inner pipe 12 is mounted for rotation in upper and lower pillar-block bearings 16 and 18 and a pulley 20 mounted at the end of pipe 12 above bearing 18 is connected to a suitable source of power to provide rotation of pipe 12. Inner pipe 12 includes plurality of generally rectangular slots 22 formed therein along the length thereof. As illustrated, the slots 22 are spaced closer together at the top of pipe 12 than at the bottom so as to better enable liquid to escape from the pipe 14 at the top where the pressure is less.

Outer pipe 14, which may comprise a simple plexiglass tube, is mounted in a pair of support assemblies 24 and 26. Upper support assembly 24 comprises an inner flange 24a and an outer flange 24b having a gasket 24c, fabricated of neoprene or the like, captured therebetween when flanges 24a, 24b are bolted together by bolts 24d. Similarly, lower support assembly 26 includes an inner flange 26a, an outer flange 26b, and an intermediate gasket 26c bolted together by bolts 26d. Upper and lower nylon bushings 28 and 30 are respectively disposed between the upper and lower ends of pipe 14 and corresponding outer surfaces of inner flanges 24a, 26a. A suitable outlet, in the form of an outlet tube 32 is located at the bottom of pipe 14 and a washer is provided at 34.

Figure 2:
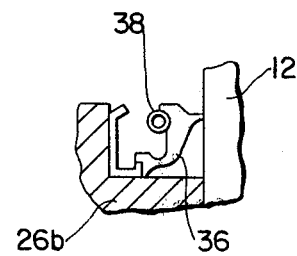
FIG. 2 is a detail, to an enlarged scale, of the encircled portion of FIG. 1.

A rotary seal assembly provided in lower support assembly 26 between inner pipe 12 and outer pipe 24 is illustrated in FIG. 2 and basically comprises an annular (nitrile) sealing element 36 which engages the outer wall of inner pipe 14 and is held in engagement by a girdle spring 38. The sealing element 36 is disposed in a recess in outer flange 26b below gasket 26c as shown in FIG. 1. A similar rotary seal assembly, generally denoted 40, is disposed within upper support assembly 24.

In operation, in order to effect phase separation of two immiscible liquids the liquids are changed into the bottom of inner pipe 12 as indicated in the drawings. Inne pipe 12 is rotated by pulley 20 and the associated drive therefor and the longitudinally disposed slots 22 formed in inner pipe 12 permit the heavier phase to exit in the radial (or a combined radial and vertical) direction. The lighter phase flows longitudinally upward through the rotating pipe 12 and exits at the top in the overflow.

In tests conducted utilizing a device constructed in accordance with the invention, a total of 45 runs were conducted and feed ratios (at three levels) and flow rates (at five levels) were used as the variable parameters. The rotational speed was maintained constant at 863 RPM and oil of a specific gravity of 0.746 was used as the lighter phase and water as the heavier phase. The test results with respect to separation efficiency indicated that optimum values are obtained at lower flow rates and higher feed ratios (oil/water), and that at these rates and ratios ideal separation efficiency was approached.

Although the invention has been described in relation to exemplary embodiments thereof, it will be understood by those skilled in the art that variations and modifications can be effected in these exemplary embodiments without departing from the scope and spirit of the invention.

I claim:

1. A phase separation apparatus for providing phase separation of two immiscible liquids of heavier and lighter phases, said apparatus comprising an inner vertically extending rotatable tube including an inlet at the bottom thereof for receiving the two immiscible liquids and a plurality of openings along the length thereof, said openings being more closely spaced together at the top of the inner tube than at the bottom thereof, a fixed outer tube surrounding the inner vertically extending tube and forming an outer chamber therewith, said outer tube being mounted in a pair of flange assemblies each including a resilient gasket captured between a pair of flange members, means for rotating the inner tube, when the liquids are axially charged into the bottom inlet of said inner tube, such that the heavier phase is separated from the lighter phase and exits through said openings in said inner tube into said outer chamber, means for collecting the lighter phase from the top of the inner tube and means for collecting the heavier phase from said outer chamber.

2. A phase separation apparatus as claimed in claim 1 wherein at least one sealing element is biassed into engagement with the outer surface of the inner tube.

3. A phase separation apparatus as claimed in claim 1 further comprising a sealing element, mounted within one of the flange members of each of the pair of flange members, for engaging the outer wall of the inner tube.

4. A phase separation apparatus as claimed in claim 1 comprising upper and lower bearings for rotatably supporting said inner pipe.

5. A phase separation apparatus as claimed in claim 1 wherein said means for rotating said inner tube comprises a pulley member fixedly secured to the inner tube and connected to drive means for causing rotation of the pulley member and hence of the inner tube.

* * * * *